United States Patent
Jones

(10) Patent No.: US 9,611,927 B2
(45) Date of Patent: Apr. 4, 2017

(54) WORM GEARING WITH HARMONIC DRIVE OR STRAIN WAVE GEARING PRIMARY

(71) Applicant: Cone Drive Operations, Inc., Traverse City, MI (US)

(72) Inventor: Kyle M. Jones, Frankfort, MI (US)

(73) Assignee: Cone Drive Operations, Inc., Traverse City, MI (US)

( * ) Notice: Subject to any disclaimer, the term of this patent is extended or adjusted under 35 U.S.C. 154(b) by 0 days.

(21) Appl. No.: 14/563,673

(22) Filed: Dec. 8, 2014

(65) Prior Publication Data

US 2016/0084366 A1    Mar. 24, 2016

Related U.S. Application Data

(60) Provisional application No. 62/054,208, filed on Sep. 23, 2014.

(51) Int. Cl.
| | | |
|---|---|---|
| F16H 35/00 | (2006.01) | |
| F16H 49/00 | (2006.01) | |
| F16H 1/16 | (2006.01) | |

(52) U.S. Cl.
CPC ............. *F16H 49/001* (2013.01); *F16H 1/16* (2013.01)

(58) Field of Classification Search
CPC ................................ F16H 1/16; F16H 49/001
USPC ..................................................... 74/640, 425
See application file for complete search history.

(56) References Cited

U.S. PATENT DOCUMENTS

| | | | |
|---|---|---|---|
| 2,906,143 A | 9/1959 | Musser | |
| 2,983,162 A | 5/1961 | Musser | |
| 5,237,886 A | 8/1993 | Kellar | |
| 6,386,059 B1 | 5/2002 | Mittendorf, Jr. | |
| 7,178,427 B2 * | 2/2007 | Christensen | .......... F16H 37/041 74/424.7 |
| 7,303,045 B2 * | 12/2007 | Yamamori | ............. B62D 5/008 180/444 |
| 7,905,317 B2 * | 3/2011 | Kruttschnitt | ........... B62D 5/008 180/443 |
| 8,360,178 B2 * | 1/2013 | Goldenberg | ............. B25J 5/005 180/65.8 |
| 2002/0148315 A1 | 10/2002 | Mittendorf et al. | |

FOREIGN PATENT DOCUMENTS

CN          103138629          6/2013

* cited by examiner

*Primary Examiner* — Ha D Ho
(74) *Attorney, Agent, or Firm* — Clark Hill PLC; James R. Foley

(57) ABSTRACT

A gear system wherein a harmonic drive or strain wave gearing set is efficiently and effectively coupled to a worm drive, where the harmonic drive or strain wave gearing serves as the input and the worm drive serves as the output. By using the harmonic drive or strain wave gearing set as the primary, a very large reduction ratio is achieved in a right angle package with high torsional stiffness. Further, at high worm ratios, the system can be non-back driving. At low ratios, worm gearing can be highly efficient. This, combined with the harmonic drive or strain wave gearing set being used as the primary, provides a high ratio, highly efficient gear system.

9 Claims, 2 Drawing Sheets

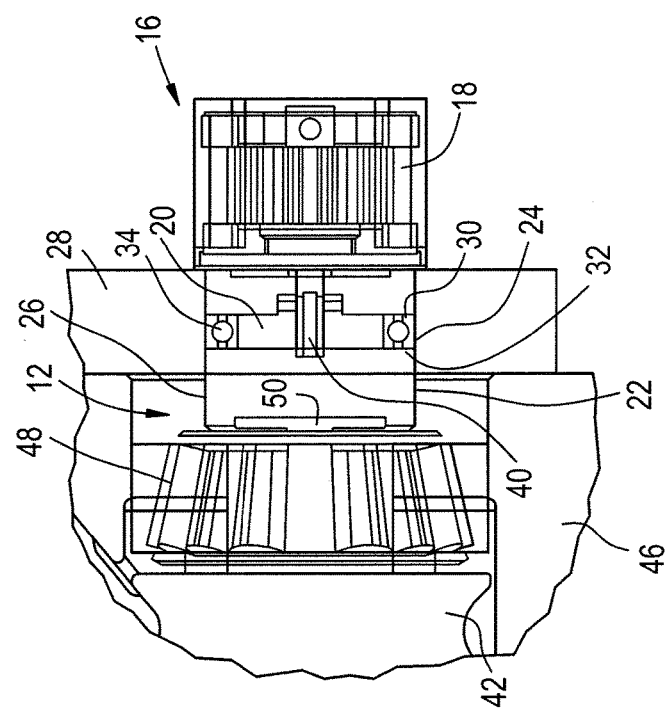
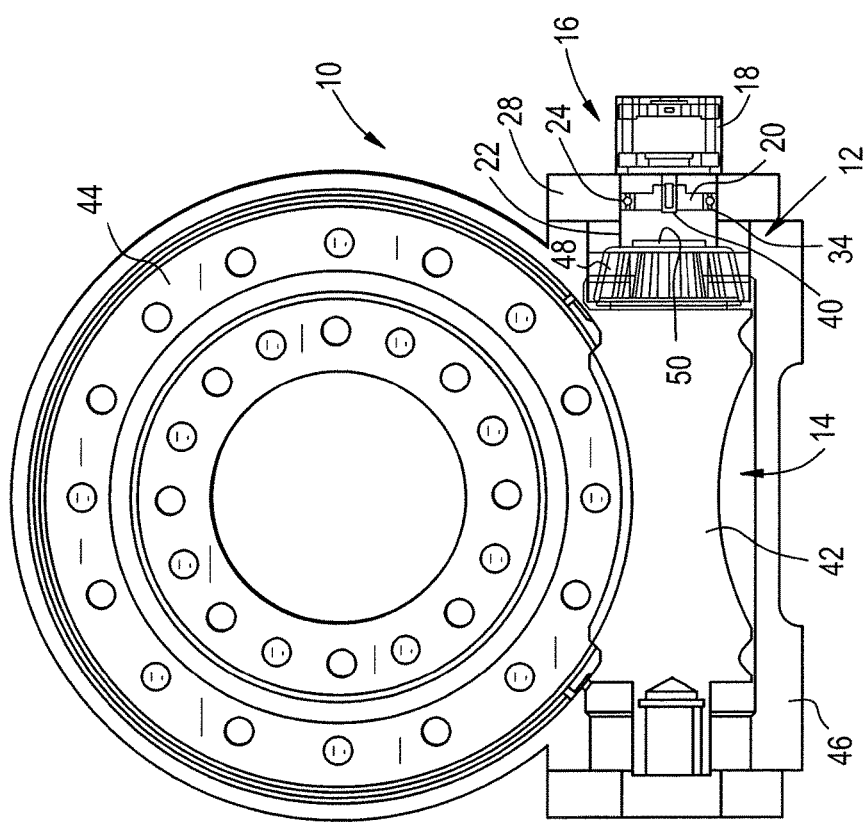

WORM GEARING WITH HARMONIC DRIVE OR STRAIN WAVE GEARING PRIMARY

RELATED APPLICATION (PRIORITY CLAIM)

This application claims the benefit of U.S. Provisional Application Ser. No. 62/054,208, filed Sep. 23, 2014, which is hereby incorporated herein by reference in its entirety.

BACKGROUND

The present invention generally relates to the coupling of a harmonic drive or strain wave gearing set to a worm drive, where the harmonic drive or strain wave gearing serves as the input.

Harmonic drives or strain wave gearing has been used for some time. For example, U.S. Pat. Nos. 2,906,143 and 2,983,162 disclose harmonic drives or strain wave gearing. Both of these patents are hereby incorporated herein by reference in their entirety. Generally speaking, a harmonic drive or strain wave gearing is a motion transmitting mechanism, wherein relative motion occurs between an internal gear and a cooperating external gear. More specifically, a harmonic drive or strain wave gearing operates by deformation of a flexible gearing member having fewer gear teeth than a mating gear. The deformation combined with the difference in gear teeth creates relative motion between the flexible gearing member and the mating gear.

Worm gearing has also been used for quite some time. For example, U.S. Pat. No. 6,386,059 discloses a worm drive. A worm drive permits a ninety-degree angle between the input and output of the gear box at a variety of ratios. In contrast, harmonic drive or strain wave gearing provides an input and an output which are coaxial at high reduction ratios. Planetary primaries are ubiquitous in their use on worm gearing. However, planetary primaries are large, inefficient and have backlash.

SUMMARY

An object of an embodiment of the present invention is to provide a gear system wherein a harmonic drive or strain wave gearing set is efficiently and effectively coupled to a worm drive, where the harmonic drive or strain wave gearing serves as the input and the worm drive serves as the output.

By using the harmonic drive or strain wave gearing set as the primary, a very large reduction ratio is achieved in a right angle package with very high torsional stiffness. Further, at high worm ratios, the system can be non-back driving—in other words, the output cannot rotate unless the input rotates. At low ratios, worm gearing can be highly efficient. This, combined with the harmonic drive or strain wave gearing set being used as the primary, provides a high ratio, highly efficient gear system.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 2 is a cross sectional view of the gear system shown in FIG. 1; and

FIG. 3 is an enlarged view of a portion of what is shown in FIG. 2.

DESCRIPTION OF AN ILLUSTRATED EMBODIMENT

Figure 1:
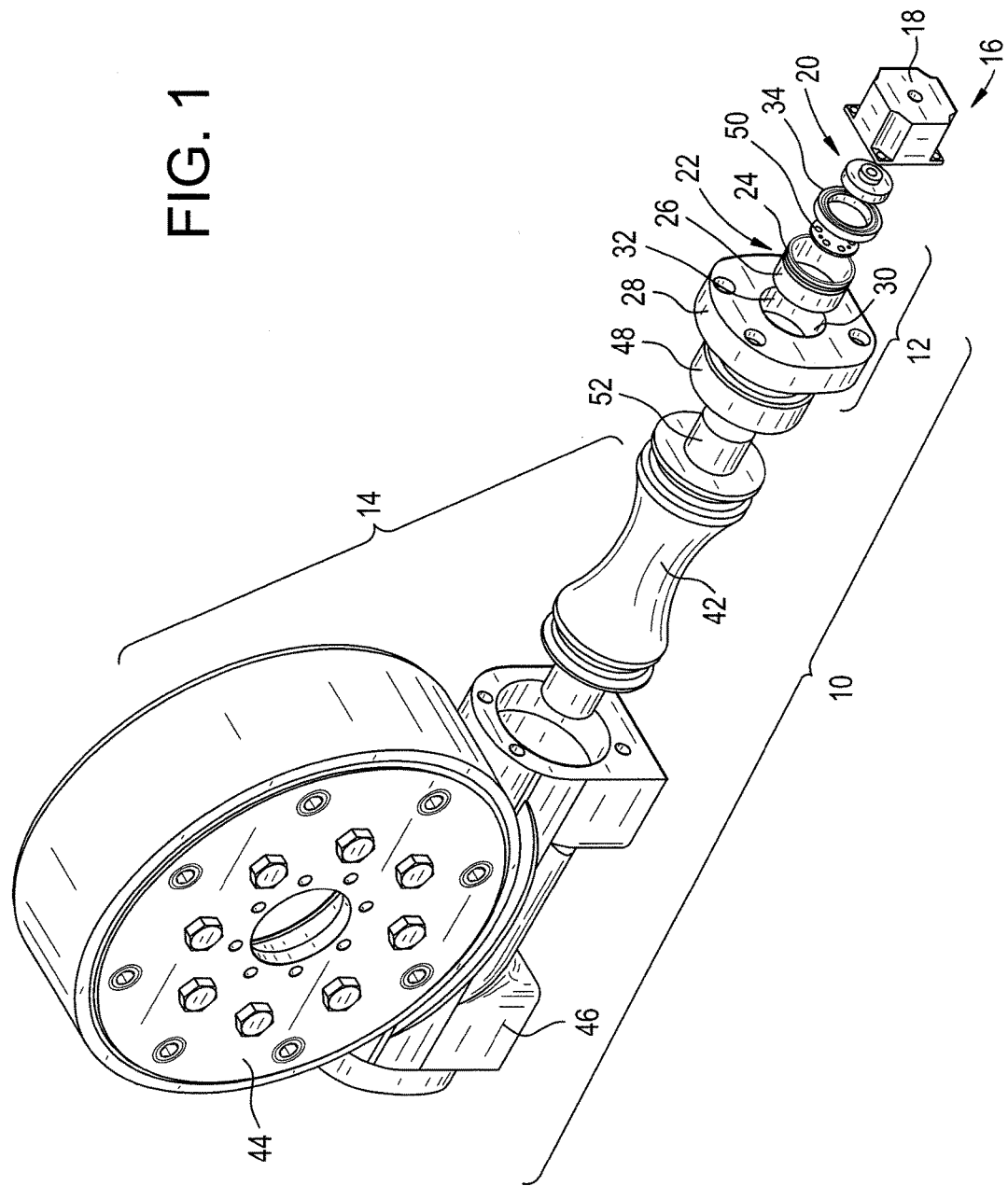
FIG. 1 is an exploded perspective view of a gear system which is in accordance with an embodiment of the present invention.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

As shown in FIGS. 1 and 2, an embodiment of the present invention provides a gear system 10 which provides that a harmonic drive or strain wave gearing set 12 is efficiently and effectively coupled to a worm drive 14, where the harmonic drive or strain wave gearing 12 serves as the input of the system 10, and the worm drive 14 serves as the output of the system 10. Preferably, the harmonic drive or strain wave gearing set 12 is connected to the worm drive 14 via a bolted connection, welded joint, commercial coupling, or can even be made part of the worm drive 14.

Preferably, engaged with the harmonic drive or strain wave gearing set 12 is a drive source 16. The drive source 16 can take many forms while still staying within the scope of the present invention. For example, the drive source 16 may be a motor 18 as shown in FIGS. 1-3, or may be a hand wheel, a planetary gear, an engine, etc.

Preferably, the harmonic drive or strain wave gearing set 12 comprises a wave generator 20, a flexible gearing member 22 having gear teeth or gearing 24 on its exterior surface 26, and a component 28 having an interior surface 30 having corresponding gear teeth or gearing 32 thereon. The flexible gearing member 22 may be provided as having fewer gear teeth than the interior surface 30 of component 28. The component 28 providing such an interior surface 30 and gearing 32 may comprise a bearing cap. A wave generator bearing 34 may be provided as being disposed between the wave generator 20 and the bearing cap 28. With regard to materials, the wave generator bearing 34 can be made from any anti-friction bearing, such as ball, roller, plain, etc. The wave generator 20 can be made of effectively any suitable, rigid material.

The drive source 16 is configured to drive the harmonic drive or strain wave gearing set 12. As shown in FIG. 3, in the case where the drive source 16 is a motor 18, the motor 18 is preferably provided as having a rotating drive shaft 40 to which the wave generator 20 is coupled. The connection between the drive source 16 and the wave generator 20 can take many forms, such as a press fit, a keyed connection, a bolted connection, a coupling such as an Oldham coupling, a spline coupling, etc.

The worm drive 14 preferably comprises a worm or worm shaft 42 which meshes with a worm gear 44 (see FIG. 2). The meshing between the worm shaft 42 and the worm gear 44 provides that when the worm shaft 42 is driven, it rotates, meshing with the worm gear 44 and causing the worm gear 44 to rotate. The worm gear 44 is effectively the output of the system 10.

Preferably, both the worm 42 and the worm gear 44 are disposed inside a gearbox housing 46. The gearbox housing 46 may be provided as being multiple parts which are secured together. Regardless, the gearbox housing 46 can be made of, for example, ductile iron, steel, Aluminum, or a polymer, none of which are preferred over the other as it depends on the application.

The worm drive gear set 14 may be provided as disclosed in either U.S. Pat. No. 5,237,886 or U.S. patent application Ser. No. 10/144,534 (which was published on Oct. 17, 2002 as United States Patent Publication No. 2002/0148315), wherein the worm drive gear set comprises a split worm gear which achieves zero backlash. Both U.S. Pat. No. 5,237,886 and United States Patent Publication No. 2002/0148315 are hereby incorporated herein by reference in their entireties. With regard to materials, the worm shaft 42 is preferably made from high strength steel, and the worm gear 44 is preferably made from a wear resistant bronze, but of course other materials may be chosen while still staying within the scope of the present invention.

A worm bearing 48 may be provided, and a flexible gear-to-worm attachment member 50 may be provided to effectively attach the harmonic drive or strain wave gearing set 12 to an end 52 of the worm 42, via a bolted connection, welded joint, commercial coupling, or can even be made part of the worm shaft 42.

Preferably, the flexible gearing member 22 is made from a ductile, robust material, and specifically may be made of a metal or a polymer. The flexible gearing member 22 may be machined directly onto the end 52 of the worm shaft 42. This is preferred as it provides for a reduction in the overall number of components. Alternatively, the flexible gearing member 22 can be bolted to the end 52 of the worm shaft 42, or be coupled via an external coupling to the end 52 of the worm shaft 42.

With regard to the internal gearing 32 of the harmonic drive or strain wave gearing set 12, this gearing 32 can be provided as being on the internal surface 30 of a bearing retainer or cap 28, as part of the gearbox housing 46, or as a separate part.

The worm bearing 48 can be configured to support both the worm 42 and the flexible gearing member 22, or just the worm 42 in conjunction with a second bearing for supporting the flexible gearing member 22. The worm bearing 48 can be made from any anti-friction bearing, such as ball, roller, plain, etc The worm 42 can be configured to provide a single drive on its end 52 or dual drives, and the worm gear 44 can be configured to provide a single worm per gear or multiple worms. With regard to the gear geometry, the worm gear 44 can be provided as being single enveloping, double enveloping or cylindrical. With regard to the worm gearing style, it can be provided as being zero backlash or can be provided as conventional gearing with backlash. With regard to the harmonic gear 12, it can be provided as being cup, pancake or any other suitable configuration.

In operation, when the drive source 16 operates, the wave generator 20 rotates. Rotation of the wave generator 20 causes the flexible gearing member 22 to deform and rotate. This deformation creates relative motion between the flexible gearing member 22 and the component 28 which provides the internal gearing 32. This relative motion is effectively the input to the worm drive 14. The worm shaft 42 thus rotates, which causes the worm shaft to mesh with, and drive, the worm gear 44. This meshing thus creates relative motion between the worm 42 and the gear 44, and the gear 44 is the overall output of the gear system, wherein the overall output of the system is preferably disposed ninety degrees relative to the input.

The present invention provides the benefits of both a harmonic drive or strain wave gearing set and a worm gear set, where the harmonic drive or strain wave gearing serves as the input and the worm drive serves as the output. By using the harmonic drive or strain wave gearing set as the primary, a very large reduction ratio is achieved in a right angle package with very high torsional stiffness. Further, at high worm ratios, the system can be non-back driving. At low ratios, worm gearing can be highly efficient. This, combined with the harmonic drive or strain wave gearing set being used as the primary, provides a high ratio, highly efficient gear system.

While a specific embodiment of the invention has been shown and described, it is envisioned that those skilled in the art may devise various modifications without departing from the spirit and scope of the present invention.

What is claimed is:

1. A gearing system comprising: a worm drive; and a harmonic drive coupled with the worm drive, wherein the harmonic drive serves as the input, and drives the worm drive, wherein the worm drive comprises a worm gear, and a worm shaft meshed with the worm gear, further comprising an input device having a rotating drive shaft, wherein the harmonic drive comprises a wave generator which is engaged with the rotating drive shaft of the input device, wherein the harmonic drive comprises a flexible gearing member, wherein the rotating drive shaft of the input device drives the harmonic drive causing the wave generator to rotate, wherein rotation of the wave generator causes the flexible gearing member to deform and rotate, wherein rotation and deformation of the flexible gearing member causes the worm shaft to rotate, wherein rotation of the worm shaft causes rotation of the worm gear via meshing therebetween, wherein the harmonic drive is disposed between the input device and the worm drive, and wherein the worm shaft is meshed with the worm gear such that an overall output of the gearing system provided at the worm gear is disposed ninety degrees relative to the input provided by the rotating drive shaft.

2. A gearing system as recited in claim 1, wherein the harmonic drive comprises a wave generator which is either engaged with or integral with the worm drive, wherein rotation of the harmonic drive results in rotation of the worm gear.

3. A gearing system as recited in claim 2, wherein the harmonic drive further comprises a flexible gearing member which is configured to deform and rotate in response to rotation of the wave generator.

4. A gearing system as recited in claim 3, wherein the flexible gearing member comprises gearing on an exterior surface, wherein the gearing on the exterior surface of the flexible gearing member engages gearing on an interior surface of a separate component.

5. A gearing system as recited in claim 4, wherein the flexible gearing member has fewer gear teeth than does the interior surface of the separate component.

6. A gearing system as recited in claim 1, wherein the worm shaft has at least one of a single enveloping worm, a double enveloping worm, and a cylindrical worm.

7. A gearing system as recited in claim 3, wherein the flexible gearing member is connected to, or integral with, the worm shaft of the worm drive.

8. A gearing system as recited in claim 3, wherein the flexible gearing member is connected to the worm shaft of the worm drive, wherein rotation of the wave generator causes rotation and deformation of the flexible gearing member which causes rotation of the worm shaft which causes rotation of the worm gear.

9. A gearing system as recited in claim 3, wherein the input device comprises a motor.

* * * * *